United States Patent
Fukutake

[11] Patent Number: 6,128,139
[45] Date of Patent: *Oct. 3, 2000

[54] MICROSCOPE OBJECTIVE LENS

[75] Inventor: Naoki Fukutake, Kawasaki, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/961,054

[22] Filed: Oct. 30, 1997

[30] Foreign Application Priority Data

Oct. 30, 1996 [JP] Japan .................................. 8-304036

[51] Int. Cl.⁷ .............................. G02B 21/02; G02B 9/12
[52] U.S. Cl. ............................................ 359/661; 359/784
[58] Field of Search .................................... 359/656–661, 359/784

[56] References Cited

U.S. PATENT DOCUMENTS

| | | |
|---|---|---|
| 5,132,845 | 7/1992 | Suzuki .................................... 359/656 |
| 5,191,473 | 3/1993 | Kashima et al. ........................ 359/659 |
| 5,216,545 | 6/1993 | Saito ....................................... 359/661 |
| 5,532,878 | 7/1996 | Suenaga et al. ........................ 359/657 |
| 5,729,391 | 3/1998 | Ito ........................................... 359/661 |
| 5,828,498 | 10/1998 | Sekiya et al. .......................... 359/660 |
| 5,889,617 | 3/1999 | Yamada et al. ......................... 359/657 |

*Primary Examiner*—Georgia Epps
*Assistant Examiner*—Jordan M. Schwartz
*Attorney, Agent, or Firm*—Chapman & Cutler

[57] ABSTRACT

An achromat-class microscope objective lens, which has a magnification of about 10 times and in which various types of aberration are corrected in peripheral portions of an image, includes a first lens group having a cemented lens composed of a double-concave lens and a double-convex lens, a second lens group having a positive lens, and a third lens group having a cemented lens composed of a double-concave lens and a double-convex lens. The first, second and third lens groups are arranged in that order from an object. The microscope objective lens satisfies certain predetermined expressions.

8 Claims, 15 Drawing Sheets

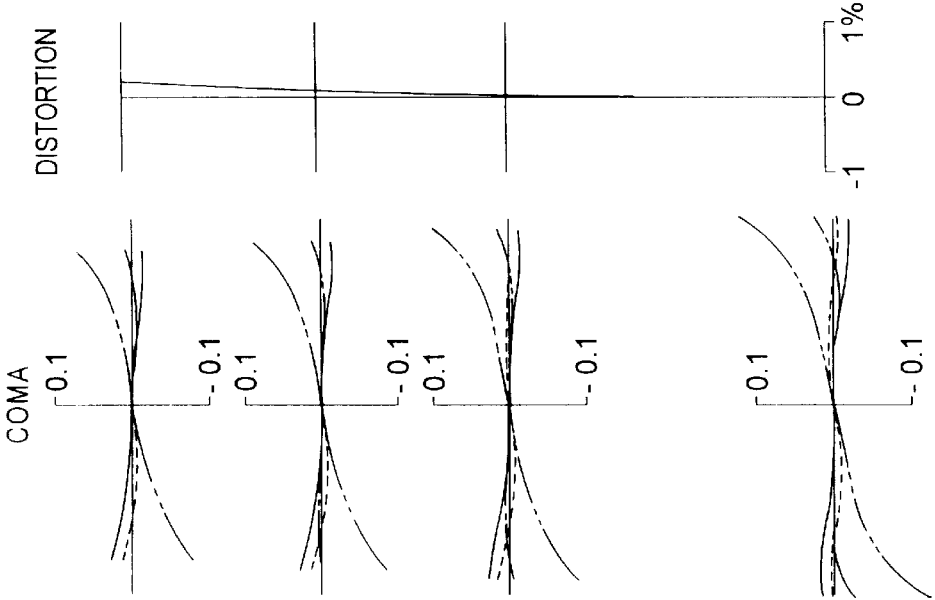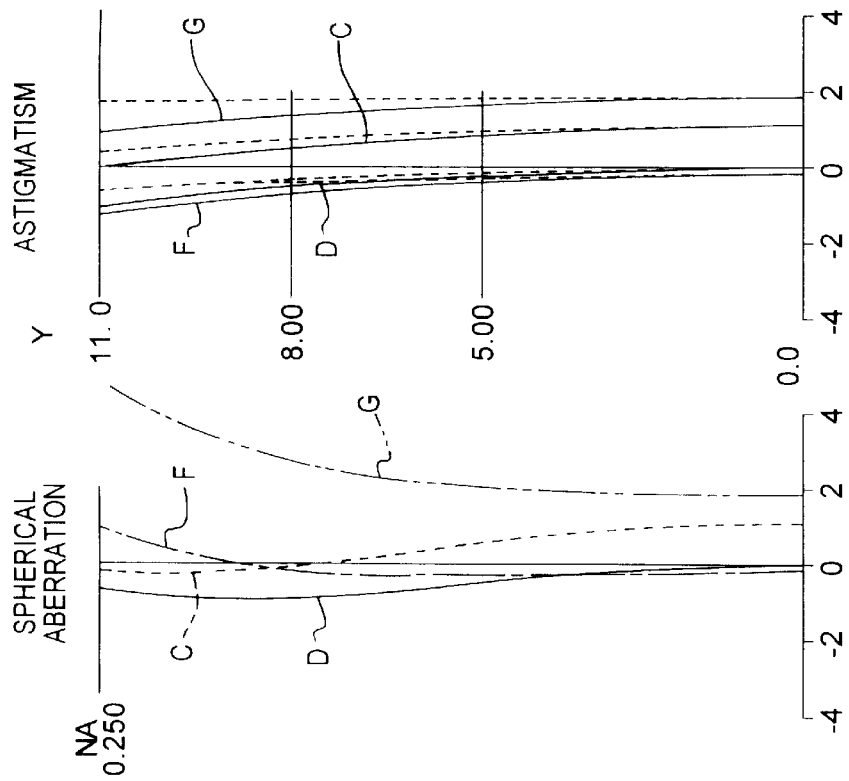

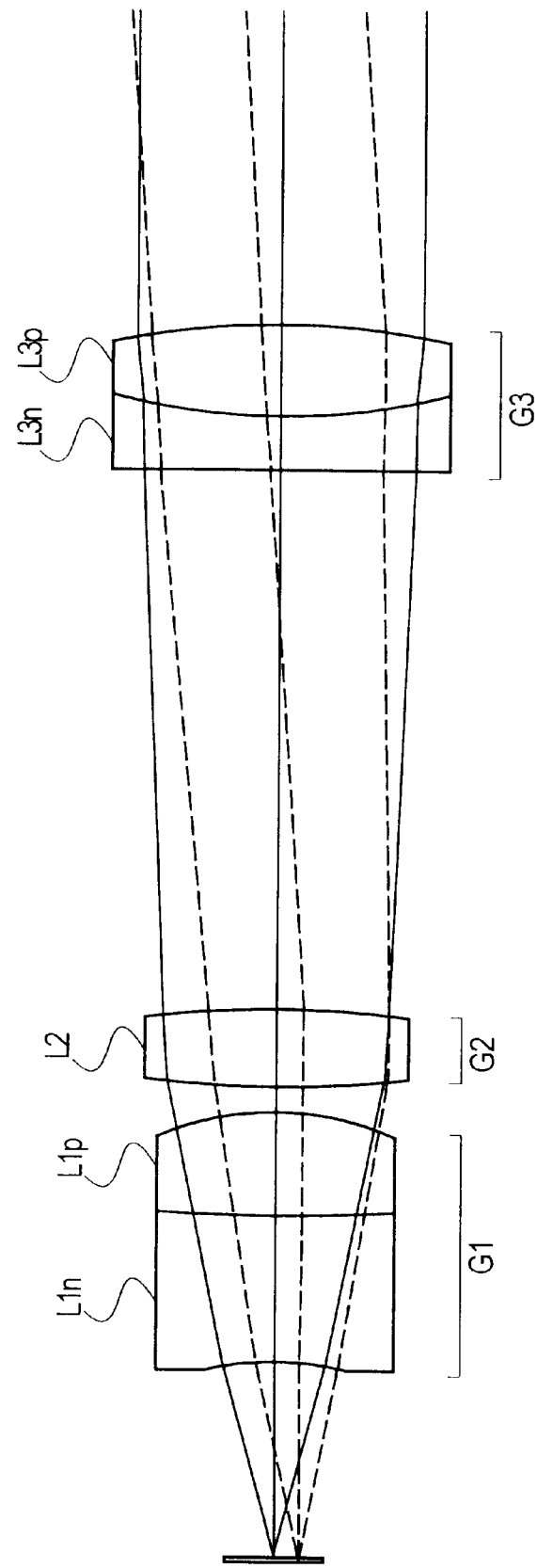

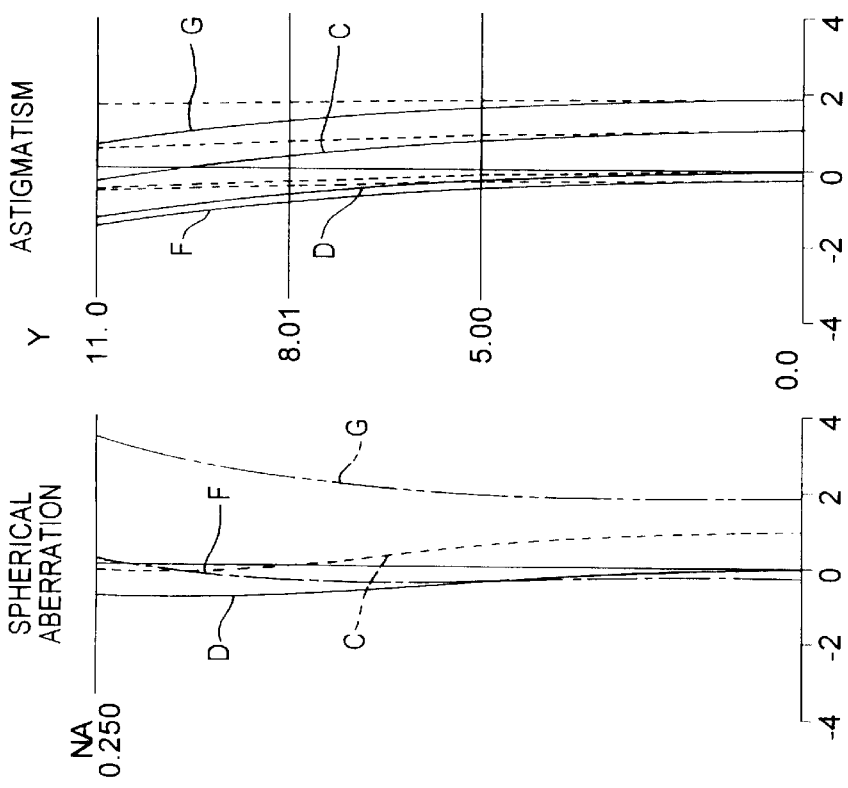

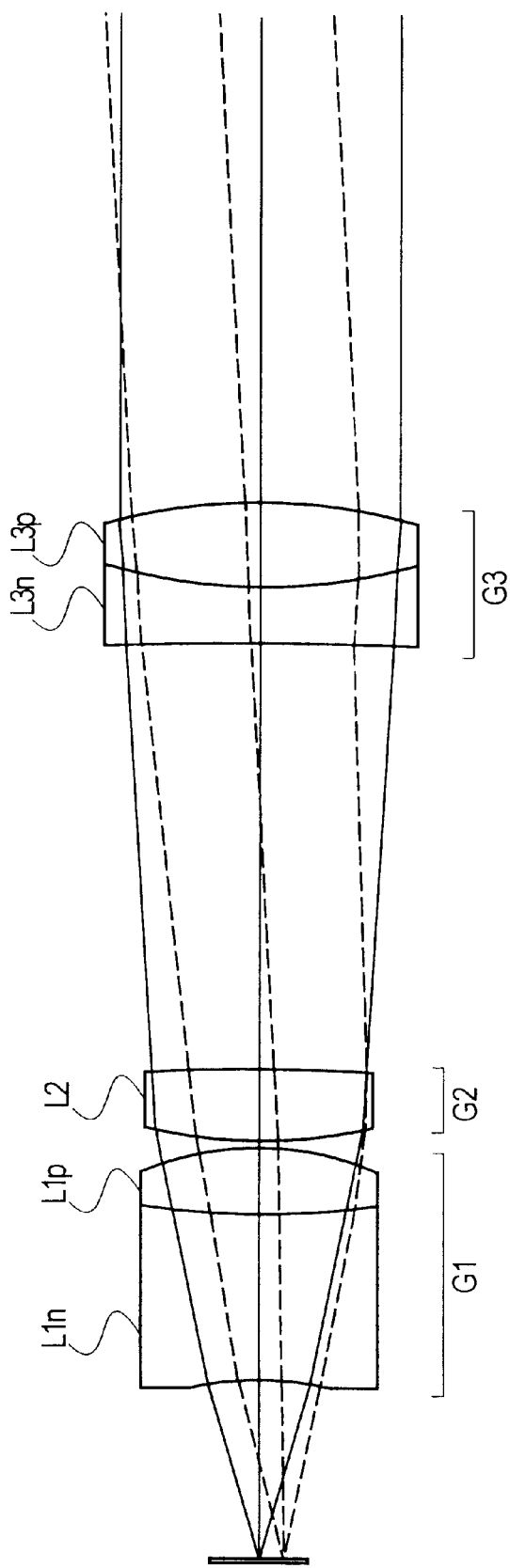

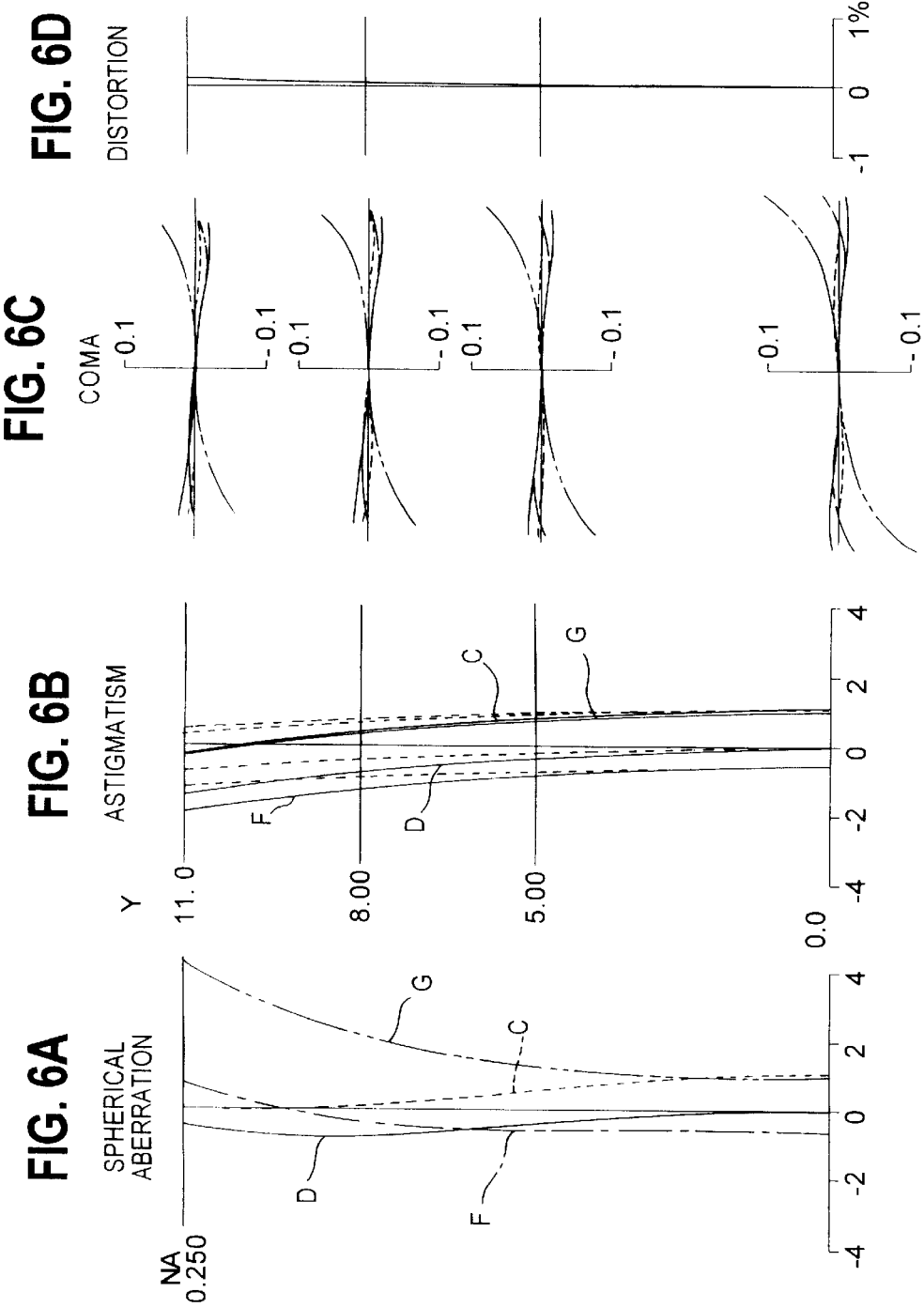

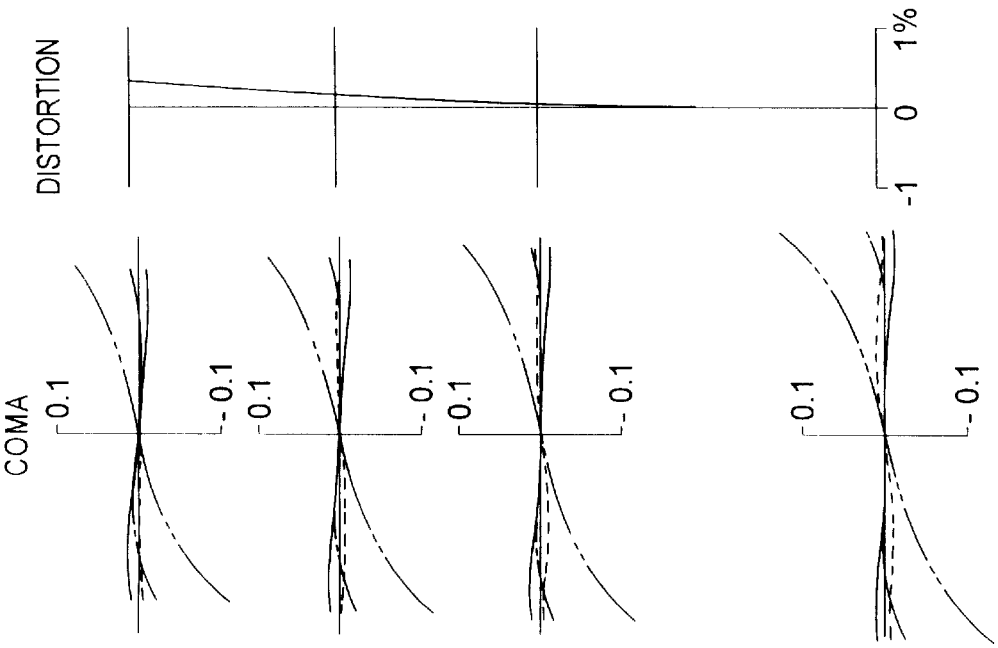
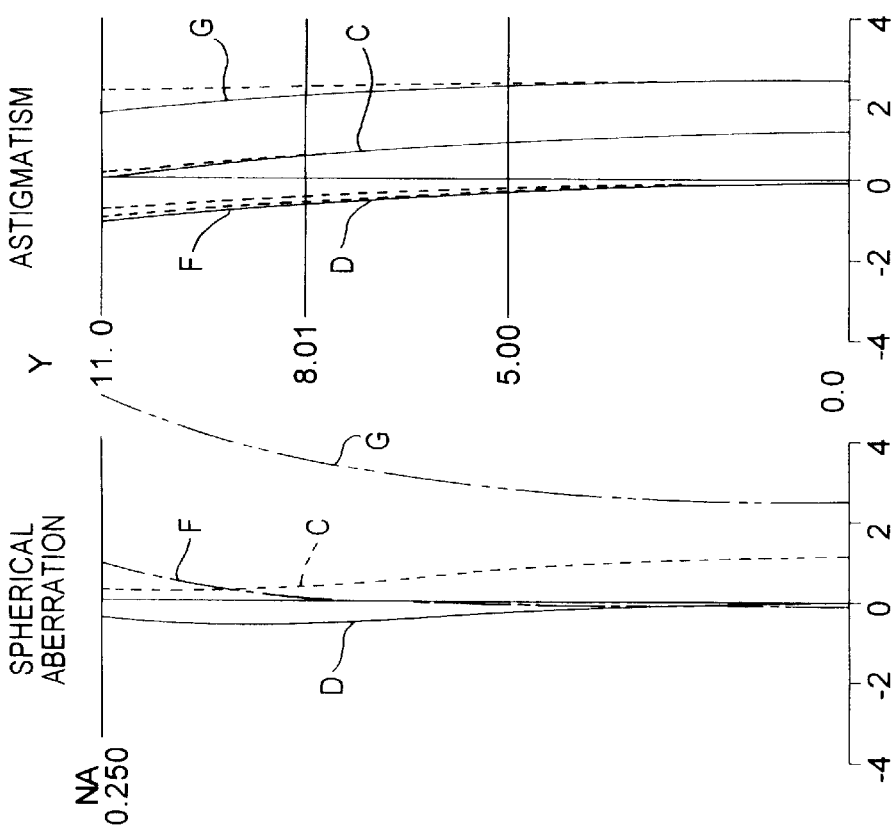

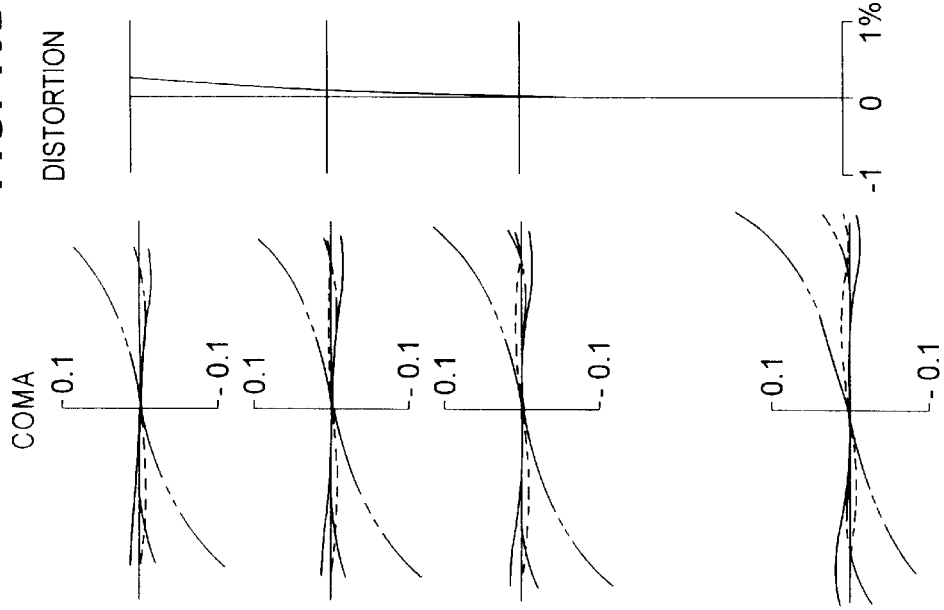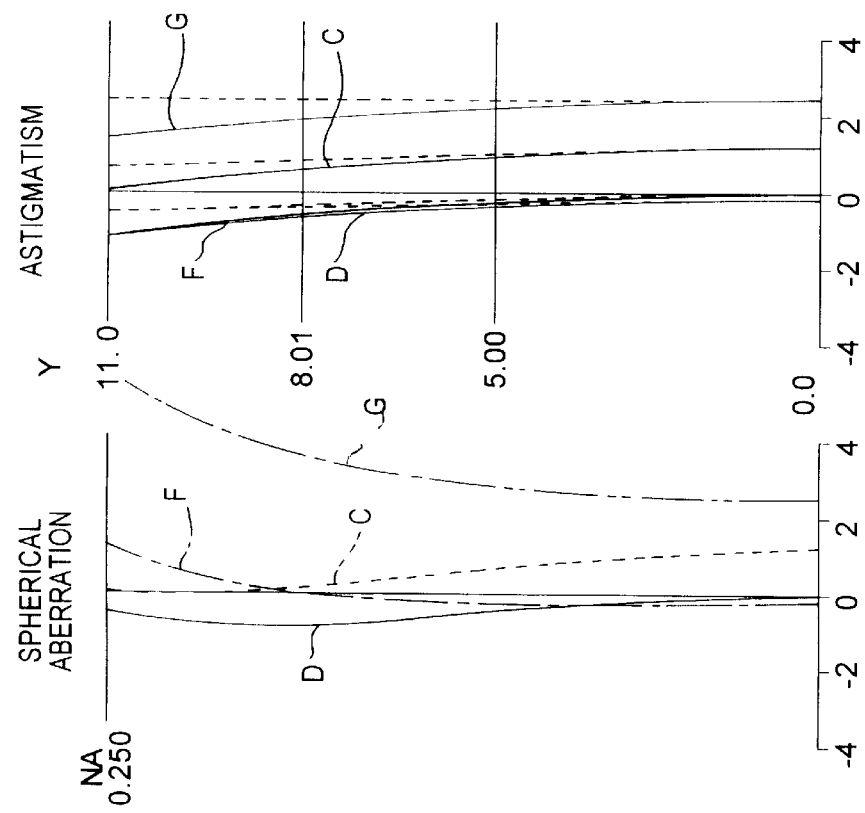

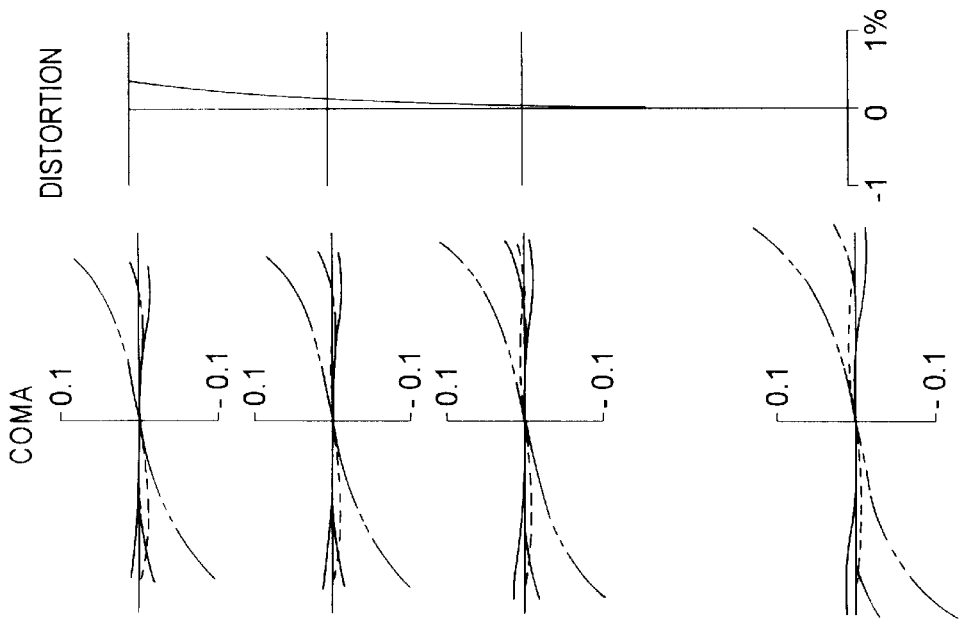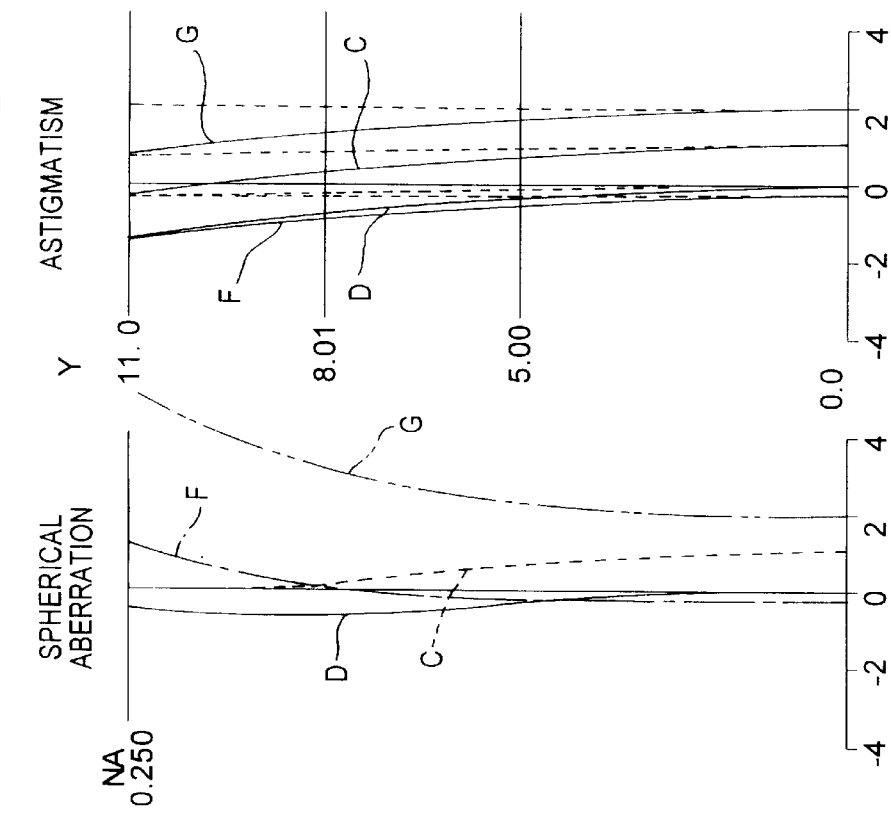

MICROSCOPE OBJECTIVE LENS

BACKGROUND OF THE INVENTION

1. Field of the Invention

The present invention generally relates to a microscope objective lens. In particular, the present invention relates to an achromat-class microscope objective lens having a magnification of about 10 times.

2. Description of Related Art

A conventional achromat-class microscope objective lens is required to be manufactured inexpensively. In order to reduce the cost of a conventional achromat-class microscope objective lens, the flatness of an image formed by the objective lens and the correction of various types of aberration are sacrificed.

SUMMARY OF THE INVENTION

It is an object of the present invention to provide an inexpensive achromat-class microscope objective lens having a magnification of about 10 times in which various types of aberration can be satisfactorily corrected even in peripheral portions of an image.

In order to achieve this object, according to the present invention, a microscope objective lens includes, in order from an object side: a first lens group G1 having a cemented lens cemented to a bi-concave lens L1n and a bi-convex lens L1p, a second lens group G2 having a positive lens, and a third lens group G3 having a cemented lens composed of a bi-concave lens L3n and a bi-convex lens L3p. In the microscope objective lens, the following expressions are satisfied:

$$-1.0 < f/f1 < 1.0$$

$$0 < n3n - n3p$$

$$20 < v1p - v1n$$

where f is the focal length of the whole lens system, f1 is the focal length of the first lens group G1, n3p is a refractive index for the d-line of the double-convex lens L3p of the cemented lens of the third lens group G3, n3n is a refractive index for the d-line of the double-concave lens L3n of the cemented lens of the third lens group G3, v1p is the Abbe number of the double-convex lens L1p of the cemented lens of the first lens group G1, and v1n is the Abbe number of the double-concave lens L1n of the cemented lens of the first lens group G1.

BRIEF DESCRIPTION OF THE DRAWINGS

FIG. 2 shows various types of aberration in the first example.

FIG. 3 illustrates a lens layout of a microscope objective lens according to a second example of the present invention.

FIG. 4 shows various types of aberration in the second example.

FIG. 5 illustrates a lens layout of a microscope objective lens according to a third example of the present invention.

FIG. 6 shows various types of aberration in the third example.

FIG. 8 shows various types of aberration in the fourth example.

FIG. 10 shows various types of aberration in the fifth example.

FIG. 12 shows various types of aberration in the sixth example.

DESCRIPTION OF THE PREFERRED EMBODIMENTS

Figure 1:
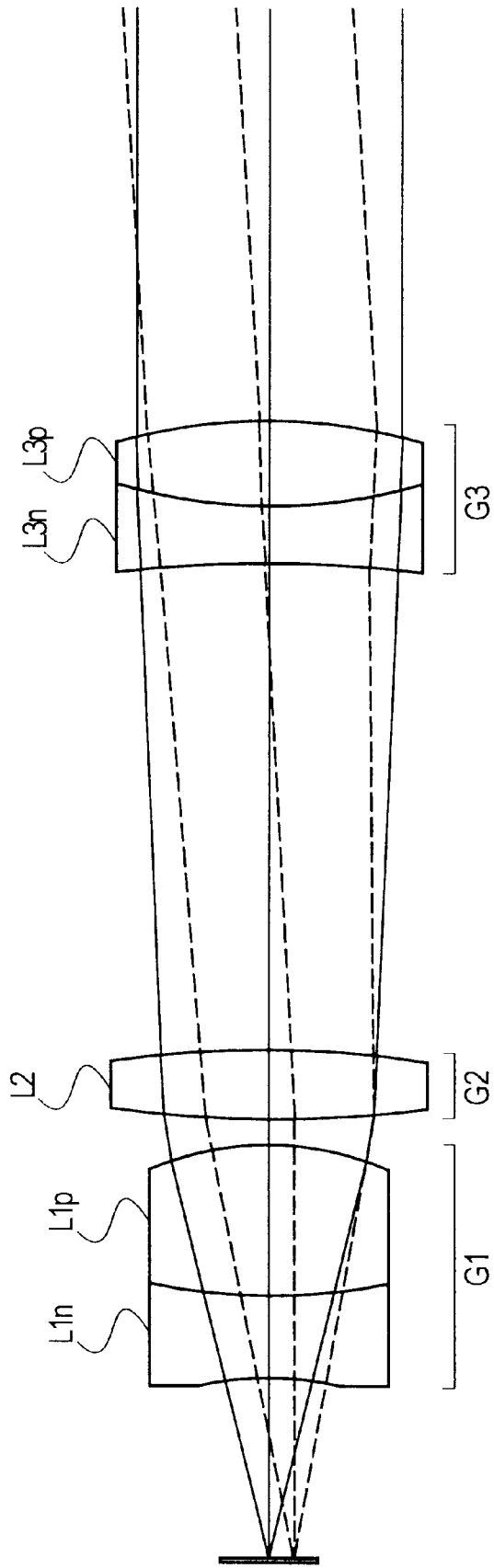
FIG. 1 illustrates a lens layout of a microscope objective lens according to a first example of the present invention.

The microscope objective lens of the present invention includes, in order from an object-side, a first lens group G1 having a cemented lens cemented to a double-concave lens L1n and the double-convex lens L1p, a second lens group G2 having a positive lens L2, and a third lens group G3 having a cemented lens cemented to a double-concave lens L3n and a double-convex lens L3p.

By including the first lens group G1 and the second lens group G2 in this order from an object, the refractive power of the first and second lens groups of the objective lens is distributed, thereby allowing the aberration to be corrected satisfactorily. For a particular refractive power, aberration is smaller when two lenses are used in place of one lens. Moreover, by having the first lens group G1 constituted by the cemented lens including the double-convex lens and the double-concave lens, chromatic aberration can be corrected more satisfactorily. Furthermore, by having the third lens group G3 constituted by the cemented lens of the double-convex lens and the double-concave lens, satisfactory aberration correction can be realized in the microscope objective lens.

In addition to the above arrangement, the following expressions (1) through (3) are satisfied in the present invention.

$$-1.0 \leq f/f1 < 1.0 \tag{1}$$

$$0 < n3n - n3p \tag{2}$$

$$20 \leq v1p - v1n \tag{3}$$

In the above expressions, f is the focal length of the whole lens system, f1 is the focal length of the first lens group G1, n3p is the refractive index for the d-line of the double-convex lens L3p of the cemented lens of the third lens group G3, n3n is the refractive index for the d-line of the double-concave lens L3n of the cemented lens of the third lens group G3, v1p is the Abbe number of the double-convex lens L1p of the cemented lens of the first lens group G1, and v1n is the Abbe number of the double-concave lens L1n of the cemented lens of the first lens group G1.

Expression (1) defines a condition required for limiting the refractive power of the first lens group G1.

When the value of f/f1 exceeds the upper limit of expression (1), the Petzval sum becomes remarkably large. This makes it difficult to maintain the flatness of the image.

On the other hand, when the value of f/f1 falls below the lower limit of expression (1), it is necessary to provide the second lens group G2 with an excessively large refractive power, resulting in worsened spherical aberration.

Expression (2) defines a condition required for performing the well-balanced correction of various types of aberration.

When the value of (n3n–n3p) falls below the lower limit of expression (2), i.e., zero, the well-balanced correction of the various types of aberration cannot be performed. Consequently, field curvature cannot be removed.

Expression (3) defines a condition with respect to the chromatic aberration.

When the value of (ν1p–ν1n) falls below the lower limit of expression (3), the chromatic aberration is generated largely in the first lens group G1. As a result, proper correction of chromatic aberration generated in the first lens group G1 by using the second lens group G2 and the third lens group G3 becomes difficult.

EXAMPLES

Hereinafter, specific examples of the present invention will be explained with respect to the drawings.

In each example, the microscope objective lens of the present invention includes, in order from the object-side, the first lens group G1 having the cemented lens cemented to the double-concave lens L1n and the double-convex lens L1p, the second lens group G2 having the positive lens L2, and the third lens group G3 having the cemented lens cemented to the double-concave lens L3n and the double-convex lens L3p.

In each example, an imaging lens (the second objective lens) is disposed on the image-side of the microscope objective lens with a predetermined space therebetween. The predetermined space is set within a range of 90 mm to 200 mm, for example. The combination of the microscope objective lens and the imaging lens forms a finite optical system.

Figure 15:
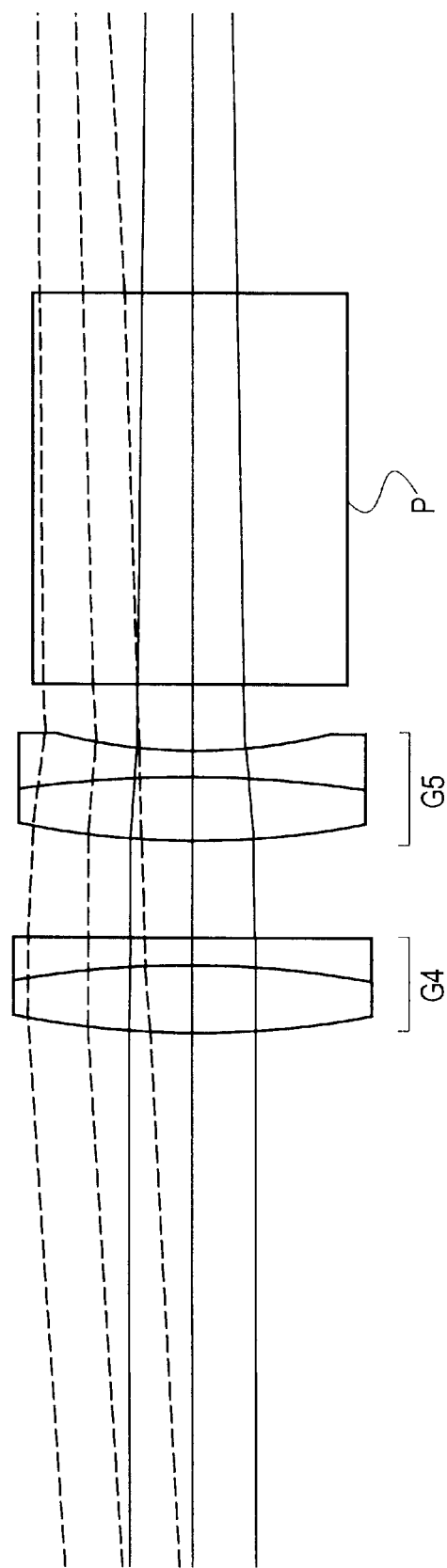
FIG. 15 illustrates a lens layout of an imaging lens in each of the first to seventh examples.

FIG. 15 illustrates a lens layout of the imaging lens used each example.

As shown in FIG. 15, the imaging lens is constituted by a positive cemented lens G4 of a double-convex lens and a double-concave lens, a negative cemented lens G5 of a double-convex lens and a double-concave lens, and a prism P.

Values for various items of the imaging lens in each example are listed in Table 1. In Table 1, numerals at the left end denote the order of lens surface, r denotes the radius of curvature of the lens surface, d denotes the distance between the lens surfaces, and n and ν denote a refractive index for the d-line (λ=587.6 nm) and the Abbe number, respectively. In all tables, unless otherwise specified, lengths, distances and so on are in mm.

TABLE 1

| | r | d | n | ν |
|---|---|---|---|---|
| 1 | 75.0430 | 5.10 | 1.62 | 57.0 |
| 2 | −75.0430 | 2.00 | 1.75 | 35.2 |
| 3 | 1600.5800 | 7.50 | | |
| 4 | 50.2560 | 5.10 | 1.67 | 42.0 |
| 5 | −84.5410 | 1.80 | 1.61 | 44.4 |
| 6 | 36.9110 | 5.50 | | |
| 7 | ∞ | 30.00 | 1.57 | 56.0 (Prism P) |
| 8 | ∞ | | | |

Example 1

FIG. 1 illustrates a lens layout of a microscope objective lens according to the first example of the present invention.

The microscope objective lens shown in FIG. 1 includes, in order from the object-side, a first lens group G1 having a negative cemented lens composed of a double-concave lens L1n and a double-convex lens L1p, a second lens group G2 having a double-convex lens L2 and a third lens group G3 having a positive cemented lens composed of a double-concave lens L3n and a double-convex lens L3p.

Values for various items in this example of the present invention are listed in Table 2. In Table 2, f denotes the focal length of the microscope objective lens only, NA denotes numerical aperture, β denotes the magnification obtained when the microscope objective lens and the imaging lens are used, WD denotes the working distance (the distance d0 along the optical axis between the image-side surface of a cover glass and the surface located closest to the object in the first lens group G1), f1 denotes the focal length of the first lens group G1, f2 denotes the focal length of the second lens group G2, and f3 denotes the focal length of the third lens group G3.

Numerals at the left end denote the order of lens surface from the object-side, r denotes the radius of curvature of the lens surface, d denotes the distance between the lens surfaces, and n and ν denote a refractive index for the d-line (λ=587.6 nm) and the Abbe number, respectively.

TABLE 2

| f = 20.0 | | | |
|---|---|---|---|
| NA = 0.25 | | | |
| β = 10× | | | |
| WD = 6.503 | | | |

| | r | d | n | ν |
|---|---|---|---|---|
| 1 | −11.0354 | 2.95 | 1.81 | 25.5 |
| 2 | 20.1005 | 5.35 | 1.66 | 50.8 |
| 3 | −11.5397 | 0.60 | | |
| 4 | 42.0030 | 2.55 | 1.80 | 46.7 |
| 5 | −42.0030 | 17.45 | | |
| 6 | −53.5290 | 1.85 | 1.81 | 39.6 |
| 7 | 19.3005 | 3.10 | 1.62 | 54.0 |
| 8 | −19.3005 | | | |

(Values of the variables in the expressions)
f1 = −427.73
f2 = 26.53
f3 = 110.13
(1) f/f1 = −0.047
(2) n3n − n3p = 0.19
(3) ν1p − ν1n = 15.3

FIG. 2 shows various types of aberration for the present example.

In the diagrams showing the various types of aberration, NA denotes numerical aperture, Y denotes the image height, D denotes the d-line (λ=587.6 nm), C denotes the C-line (λ=656.3 nm), F denotes the F-line (λ=486.1 nm), and G denotes the g-line (λ=435.6 nm).

In the diagrams showing astigmatism, a solid line indicates a sagittal image plane, and a broken line indicates a meridional image plane.

It is apparent from the diagrams that the various types of aberration are corrected satisfactorily in the present example.

Example 2

FIG. 3 illustrates a lens layout of a microscope objective lens according to the second example of the present invention.

The microscope objective lens shown in FIG. 3 includes, in order from the object-side, a first lens group G1 having a positive cemented lens composed of a double-concave lens L1n and a double-convex lens L1p, a second lens group G2 having a double-convex lens L2 and a third lens group G3 having a positive cemented lens composed of a double-concave lens L3n and a double-convex lens L3p.

Values for various items in this example of the present invention are listed in Table 3. In Table 3, f denotes the focal length of the microscope objective lens only, NA denotes numerical aperture, β denotes the magnification obtained when the microscope objective lens and the imaging lens are used, WD denotes the working distance (the distance do along the optical axis between the image-side surface of the cover glass and the surface located closest to the object in the first lens group G1), f1 denotes the focal length of the first lens group G1, f2 denotes the focal length of the second lens group G2, and f3 denotes the focal length of the third lens group G3.

Numerals at the left end denote the order of lens surface from the object-side, r denotes the radius of curvature of the lens surface, d denotes the distance between the lens surfaces, and n and ν denote a refractive index for the d-line ($\lambda$=587.6 nm) and the Abbe number, respectively.

TABLE 3

$f = 20.0$
$NA = 0.25$
$\beta = 10\times$
$WD = 6.503$

|   | r | d | n | ν |
|---|---|---|---|---|
| 1 | −13.6302 | 5.00 | 1.80 | 25.4 |
| 2 | 41.8732 | 3.30 | 1.62 | 60.1 |
| 3 | −11.6705 | 1.00 | | |
| 4 | 38.5033 | 2.55 | 1.80 | 46.7 |
| 5 | −56.3010 | 17.75 | | |
| 6 | −124.8639 | 1.85 | 1.80 | 40.9 |
| 7 | 18.6232 | 3.10 | 1.62 | 54.0 |
| 8 | −23.6048 | | | |

(Values of the variables in the expressions)
f1 = 217.31
f2 = 28.84
f3 = 90.37
(1) f/f1 = 0.092
(2) n3n − n3p = 0.18
(3) ν1p − ν1n = 34.7

FIG. 4 shows the various types of aberration for the present example.

In the diagrams showing the various types of aberration, NA denotes numerical aperture, Y denotes the image height, D denotes the d-line ($\lambda$=587.6 nm), C denotes the C-line ($\lambda$=656.3 nm), F denotes the F-line ($\lambda$=486.1 nm), and G denotes the g-line ($\lambda$=435.6 nm).

In the diagrams showing astigmatism, a solid line indicates a sagittal image plane, and a broken line indicates a meridional image plane.

It is apparent from the diagrams that the various types of aberration are corrected satisfactorily in the present example.

Example 3

FIG. 5 illustrates a lens layout of a microscope objective lens according to the third example of the present invention.

The microscope objective lens shown in FIG. 5 includes, in order from the object-side, a first lens group G1 having a negative cemented lens composed of a double-concave lens L1n and a double-convex lens L1p, a second lens group G2 having a double-convex lens L2 and a third lens group G3 having a positive cemented lens composed of a double-concave lens L3n and a double-convex lens L3p.

Values for various items in this example of the present invention are listed in Table 4. In Table 4, f denotes the focal length of the microscope objective lens only, NA denotes numerical aperture, β denotes the magnification obtained when the microscope objective lens and the imaging lens are used, WD denotes the working distance (a distance do along the optical axis between the image-side surface of the cover glass and the surface located closest to the object in the first lens group G1), f1 denotes the focal length of the first lens group G1, f2 denotes the focal length of the second lens group G2, and f3 denotes the focal length of the third lens group G3.

Numerals at the left end denote the order of lens surface from the object-side, r denotes the radius of curvature of the lens surface, d denotes the distance between the lens surfaces, and n and ν denote a refractive index for the d-line ($\lambda$=587.6 nm) and the Abbe number, respectively.

TABLE 4

$f = 20.0$
$NA = 0.25$
$\beta = 10\times$
$WD = 6.500$

|   | r | d | n | ν |
|---|---|---|---|---|
| 1 | −13.0436 | 6.00 | 1.80 | 28.6 |
| 2 | 20.4091 | 2.30 | 1.66 | 50.8 |
| 3 | −12.5008 | 0.35 | | |
| 4 | 28.3836 | 2.50 | 1.80 | 46.5 |
| 5 | −116.2243 | 15.25 | | |
| 6 | −272.9142 | 1.80 | 1.80 | 40.9 |
| 7 | 16.9631 | 3.10 | 1.62 | 54.0 |
| 8 | −22.6105 | | | |

(Values of the variables in the expressions)
f1 = −1769.37
f2 = 28.59
f3 = 68.61
(1) f/f1 = −0.011
(2) n3n − n3p = 0.18
(3) ν1p − ν1 = 22.2

FIG. 6 shows the various types of aberration for the present example.

In the diagrams showing the various types of aberration, NA denotes numerical aperture, Y denotes the image height, D denotes the d-line ($\lambda$=587.6 nm), C denotes the C-line ($\lambda$=656.3 nm), denotes the F-line ($\lambda$=486.1 nm), and G denotes the g-line ($\lambda$=435.6 nm).

In the diagrams showing astigmatism, a solid line indicates a sagittal image plane, and a broken line indicates a meridional image plane.

It is apparent from the diagrams that the various types of aberration are corrected satisfactorily in the present example.

Example 4

Figure 7:
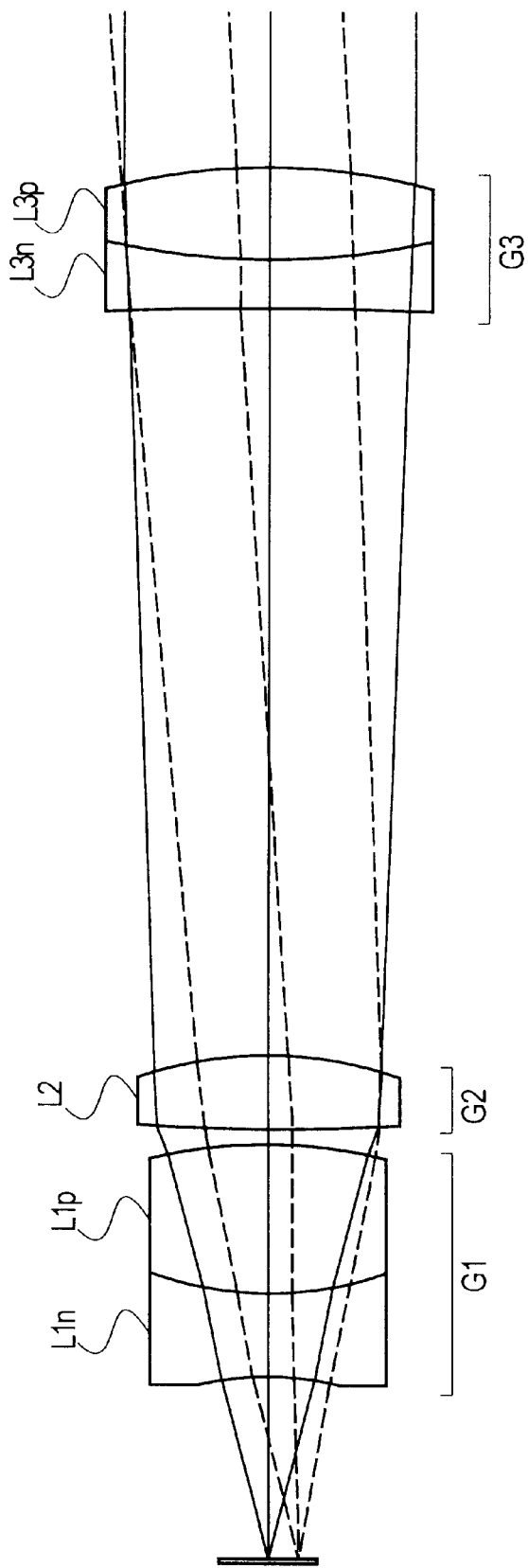
FIG. 7 illustrates a lens layout of a microscope objective lens according to a fourth example of the present invention.

FIG. 7 illustrates a lens layout of a microscope objective lens according to the fourth example of the present invention.

The microscope objective lens shown in FIG. 7 includes, in order from the object-side, a first lens group G1 having a negative cemented lens composed of a double-concave lens L1n and a double-convex lens L1p, a second lens group G2 having a double-convex lens L2 and a third lens group G3 having a positive cemented lens composed of a double-concave lens L3n and a double-convex lens L3p.

Values for various items in this example of the present invention are listed in Table 5. In Table 5, f denotes the focal length of the microscope objective lens only, NA denotes numerical aperture, β denotes the magnification obtained when the microscope objective lens and the imaging lens are used, WD denotes the working distance (the distance d0 along the optical axis between the image-side surface of the cover glass and the surface located closest to the object in the first lens group G1), f1 denotes the focal length of the first lens group G1, f2 denotes the focal length of the second lens group G2, and f3 denotes the focal length of the third lens group G3.

Numerals at the left end denote the order of lens surface from the object-side, r denotes the radius of curvature of the lens surface, d denotes the distance between the lens surfaces, and n and ν denote a refractive index for the d-line (λ=587.6 nm) and the Abbe number, respectively.

TABLE 5 f = 20.0
NA = 0.25
β = 10×
WD = 6.505

| | r | d | n | ν |
|---|---|---|---|---|
| 1 | −10.8000 | 3.00 | 1.81 | 25.4 |
| 2 | 12.8908 | 5.30 | 1.66 | 50.8 |
| 3 | −14.5000 | 0.60 | | |
| 4 | 109.1352 | 2.50 | 1.80 | 46.5 |
| 5 | −17.6837 | 26.40 | | |
| 6 | −189.7224 | 1.85 | 1.80 | 39.6 |
| 7 | 20.0581 | 3.10 | 1.62 | 54.0 |
| 8 | 32.5211 | | | |

(Values of the variables in the expressions)
f1 = −42.31
f2 = 19.09
f3 = 168.48
(1) f/f1 = −0.473
(2) n3n − n3p = 0.18
(3) ν1p − ν1n = 25.4

FIG. 8 shows the various types of aberration for the present example.

In the diagrams showing the various types of aberration, NA denotes numerical aperture, Y denotes the image height, D denotes the d-line (λ=587.6 nm), C denotes the C-line (λ=656.3 nm), denotes the F-line (λ=486.1 nm), and G denotes the g-line (λ=435.6 nm).

In the diagrams showing astigmatism, a solid line indicates a sagittal image plane, and a broken line indicates a meridional image plane.

It is apparent from the diagrams that the various types of aberration are corrected satisfactorily in the present example.

Example 5

Figure 9:
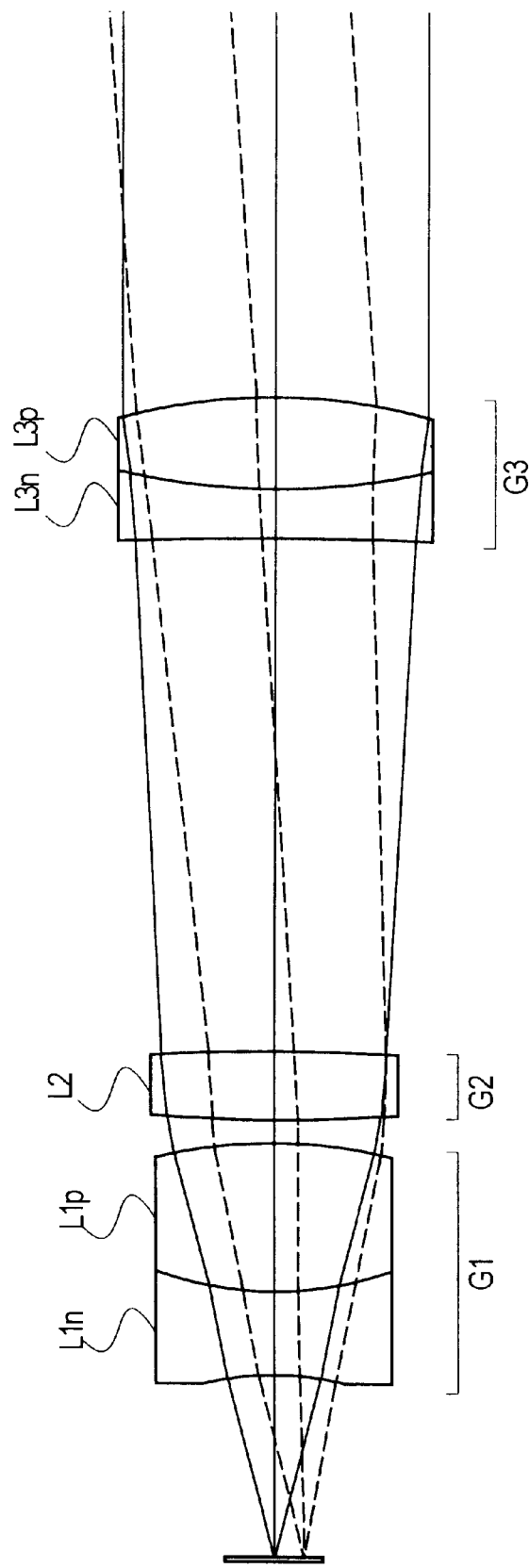
FIG. 9 illustrates a lens layout of a microscope objective lens according to a fifth example of the present invention.

FIG. 9 illustrates a lens layout of a microscope objective lens according to the fifth example of the present invention.

The microscope objective lens shown in FIG. 9 includes, in order from the object-side, a first lens group G1 having a positive cemented lens composed of a double-concave lens L1n and a double-convex lens L1p, a second lens group G2 having a double-convex lens L2 and a third lens group G3 having a positive cemented lens composed of a double-concave lens L3n and a double-convex lens L3p.

Values for various items in this example of the present invention are listed in Table 6. In Table 6, f denotes the focal length of the microscope objective lens only, NA denotes numerical aperture, β denotes the magnification obtained when the microscope objective lens and the imaging lens are used, WD denotes the working distance (the distance d0 along the optical axis between the image-side surface of the cover glass and the surface located closest to the object in the first lens group G1), f1 denotes the focal length of the first lens group G1, f2 denotes the focal length of the second lens group G2, and f3 denotes the focal length of the third lens group G3.

Numerals at the left end denote the order of lens surface from the object-side, r denotes the radius of curvature of the lens surface, d denotes the distance between the lens surfaces, and n and ν denote a refractive index for the d-line (λ=587.6 nm) and the Abbe number, respectively.

TABLE 6 f = 20.0
NA = 0.25
β = 10×
WD = 6.505

| | r | d | n | ν |
|---|---|---|---|---|
| 1 | −10.9998 | 3.00 | 1.81 | 25.4 |
| 2 | 20.0536 | 5.30 | 1.66 | 50.8 |
| 3 | −11.0000 | 0.68 | | |
| 4 | 38.9674 | 2.50 | 1.80 | 46.5 |
| 5 | −54.6811 | 18.18 | | |
| 6 | −87.9700 | 1.85 | 1.72 | 37.9 |
| 7 | 19.7078 | 3.10 | 1.51 | 54.5 |
| 8 | −19.0054 | | | |

(Values of the variables in the expressions)
f1 = 766.16
f2 = 28.64
f3 = 105.88
(1) f/f1 = 0.026
(2) n3n − n3p = 0.21
(3) ν1p − ν1n = 25.4

FIG. 10 shows the various types of aberration for the present example.

In the diagrams showing the various types of aberration, NA denotes numerical aperture, Y denotes the image height, D denotes the d-line (λ=587.6 nm), C denotes the C-line (λ=656.3 nm), F denotes the F-line (λ=486.1 nm), and G denotes the g-line (λ=435.6 nm).

In the diagrams showing astigmatism, a solid line indicates a sagittal image plane, and a broken line indicates a meridional image plane.

It is apparent from the diagrams that the various types of aberration are corrected satisfactorily in the present example.

Example 6

Figure 11:
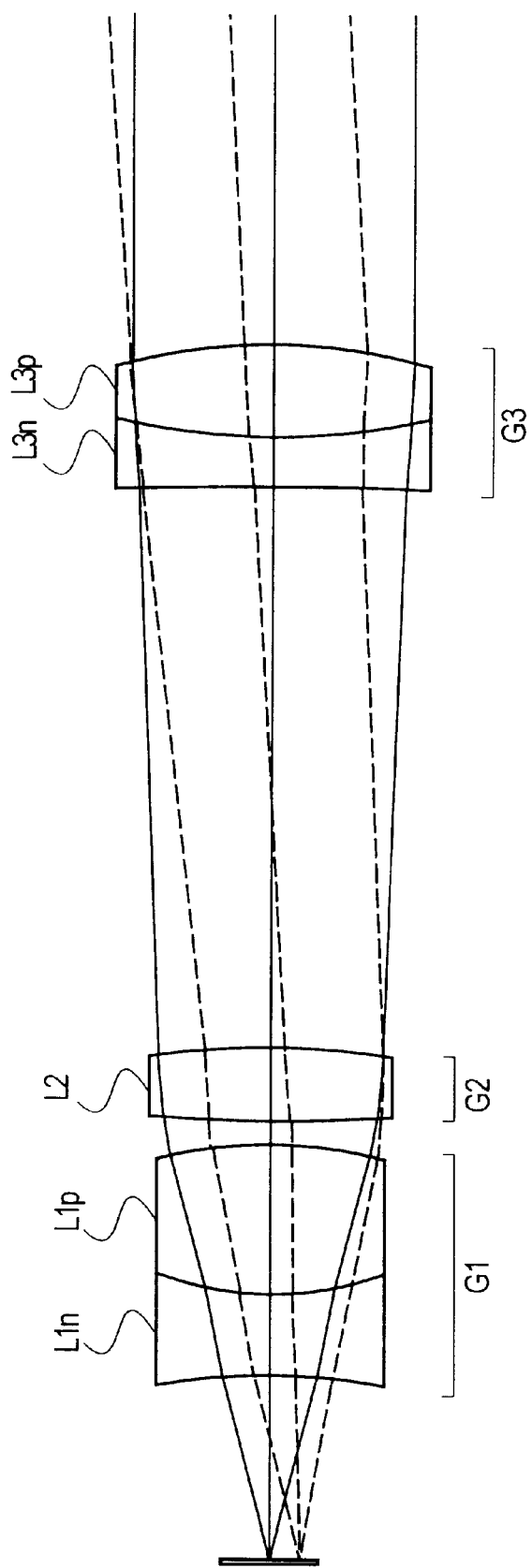
FIG. 11 illustrates a lens layout of a microscope objective lens according to a sixth example of the present invention.

FIG. 11 illustrates a lens layout of a microscope objective lens according to the sixth example of the present invention.

The microscope objective lens shown in FIG. 11 includes, in order from the object-side, a first lens group G1 having a positive cemented lens composed of a double-concave lens L1n and a double-convex lens L1p, a second lens group G2 having a double-convex lens L2 and a third lens group G3 having a positive cemented lens composed of a double-concave lens L3n and a double-convex lens L3p.

Values for various items in this example of the present invention are listed in Table 7. In Table 7, f denotes the focal length of the microscope objective lens only, NA denotes numerical aperture, β denotes the magnification obtained when the microscope objective lens and the imaging lens are used, WD denotes the working distance (the distance d0 along the optical axis between the image-side surface of the cover glass and the surface located closest to the object in the first lens group G1), f1 denotes the focal length of the first lens group G1, f2 denotes the focal length of the second lens group G2, and f3 denotes the focal length of the third lens group G3.

Numerals at the left end denote the order of lens surface from the object-side, r denotes the radius of curvature of the lens surface, d denotes the distance between the lens surfaces, and n and ν denote a refractive index for the d-line (λ=587.6 nm) and the Abbe number, respectively.

TABLE 7

| | f = 20.0 | | |
| | NA = 0.25 | | |
| | β = 10× | | |
| | WD = 6.505 | | |

| | r | d | n | ν |
|---|---|---|---|---|
| 1 | −15.6253 | 3.00 | 1.81 | 25.4 |
| 2 | 16.6876 | 5.30 | 1.77 | 50.2 |
| 3 | −12.9743 | 0.72 | | |
| 4 | 595.5739 | 2.50 | 1.80 | 46.5 |
| 5 | −30.9621 | 20.25 | | |
| 6 | −55.5827 | 1.85 | 1.80 | 39.6 |
| 7 | 23.9829 | 3.10 | 1.62 | 54.0 |
| 8 | −19.9336 | | | |

(Values of the variables in the expressions)
f1 = 49.31
f2 = 36.67
f3 = 96.62
(1) f/f1 = 0.406
(2) n3n − n3p = 0.18
(3) ν1p − ν1n = 24.8

FIG. 12 shows the various types of aberration for the present example.

In the diagrams showing the various types of aberration, NA denotes numerical aperture, Y denotes the image height, D denotes the d-line (λ=587.6 nm), C denotes the C-line (λ=656.3 nm), F denotes the F-line (λ=486.1 nm), and G denotes the g-line (λ=435.6 nm).

In the diagrams showing astigmatism, a solid line indicates a sagittal image plane, and a broken line indicates a meridional image plane.

It is apparent from the diagrams that the various types of aberration are corrected satisfactorily in the present example.

Example 7

Figure 13:
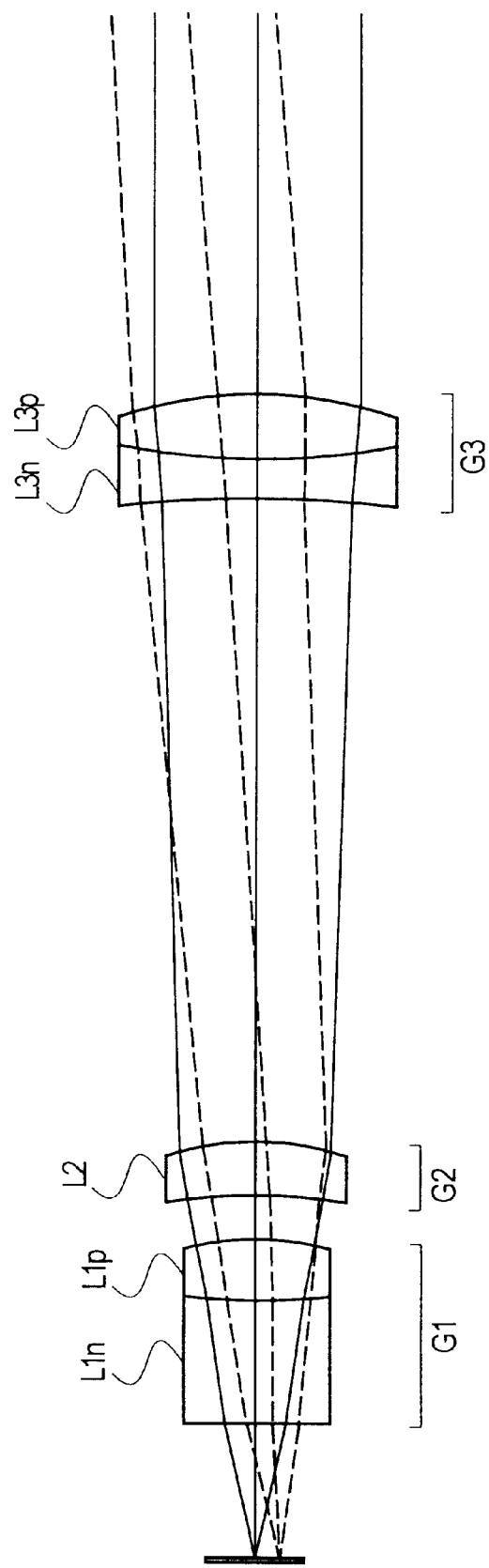
FIG. 13 illustrates a lens layout of a microscope objective lens according to a seventh example of the present invention.

FIG. 13 illustrates a lens layout of a microscope objective lens according to the seventh example of the present invention.

The microscope objective lens shown in FIG. 13 includes, in order from the object-side, a first lens group G1 having a positive cemented lens composed of a double-concave lens L1n and a double-convex lens L1p, a second lens group G2 having a positive meniscus lens L2 with the concave surface facing the object, and a third lens group G3 having a positive cemented lens composed of a double-concave lens L3n and a double-convex lens L3p.

Values for various items in this example of the present invention are listed in Table 8. In Table 8, f denotes the focal length of the microscope objective lens only, NA denotes numerical aperture, β denotes the magnification obtained when the microscope objective lens and the imaging lens are used, WD denotes the working distance (the distance d0 along the optical axis between the image-side surface of the cover glass and the surface located closest to the object in the first lens group G1), f1 denotes the focal length of the first lens group G1, f2 denotes the focal length of the second lens group G2, and f3 denotes the focal length of the third lens group G3.

Numerals at the left end denote the order of lens surface from the object-side, r denotes the radius of curvature of the lens surface, d denotes the distance between the lens surfaces, and n and μ denote a refractive index for the d-line (λ=587.6 nm) and the Abbe number, respectively.

TABLE 8

| | f = 20.0 | | |
| | NA = 0.25 | | |
| | β = 10× | | |
| | WD = 6.400 | | |

| | r | d | n | ν |
|---|---|---|---|---|
| 1 | −100.0000 | 6.00 | 1.86 | 23.0 |
| 2 | 17.9117 | 2.80 | 1.62 | 60.1 |
| 3 | −13.0000 | 2.11 | | |
| 4 | −33.0935 | 2.55 | 1.79 | 47.5 |
| 5 | −14.2820 | 30.52 | | |
| 6 | −51.8267 | 1.85 | 1.80 | 40.9 |
| 7 | 38.8587 | 3.10 | 1.55 | 49.7 |
| 8 | −20.7702 | | | |

(Values of the variables in the expressions)
f1 = 35.09
f2 = 30.09
f3 = 156.24
(1) f/f1 = 0.570
(2) n3n − n3p = 0.25
(3) ν1p − ν1n = 37.1

Figure 14:
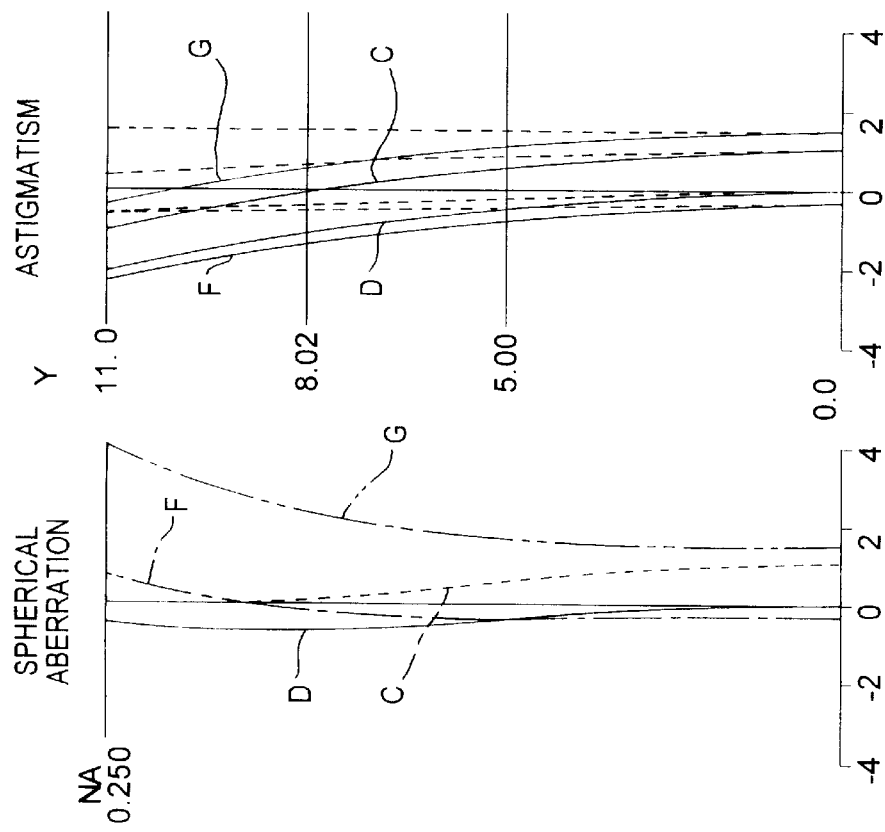
FIG. 14 shows various types of aberration in the seventh example.

FIG. 14 shows the various types of aberration for the present example.

In the diagrams showing the various types of aberration, NA denotes numerical aperture, Y denotes the image height, D denotes the d-line (λ=587.6 nm), C denotes the C-line (λ=656.3 nm), F denotes the F-line (λ=486.1 nm), and G denotes the g-line (λ=435.6 nm).

In the diagrams showing astigmatism, a solid line indicates a sagittal image plane, and a broken line indicates a meridional image plane.

It is apparent from the diagrams that the various types of aberration are corrected satisfactorily in the present example.

As described above, according to the present invention, an inexpensive achromat-class microscope objective lens with a magnification of about 10 times and numerical aperture NA of about 0.25 in which various types of aberration are corrected satisfactorily even in the peripheral portions of the image can be realized.

While the invention has been described by way of exemplary embodiments, it is understood by those skilled in the art that there are many changes and substitutions which may be made without departing from the spirit and the scope of the invention, which is defined by the appended claims.

What is claimed:

1. A microscope objective lens consisting of, in order from an object side:

a first lens group consisting of a negative cemented lens consisting of a double-concave lens and a double-convex lens;

a second lens group consisting of a single positive lens; and a third lens group consisting of a positive cemented lens consisting of a double-concave lens and a double-convex lens;

wherein the following expressions are satisfied:

$-1.00 \leq f/f_1 \leq 0;$ $0 < n_{3n} - n_{3p};$ and $20 \leq v_{1p} - v_{1n};$ where f is a focal length of the microscope objective lens system, $f_1$ is a focal length of the first lens group, $n_{3p}$ is a refractive index for a d-line of the double-convex lens of the cemented lens of the third lens group, $n_{3n}$ is a refractive index for the d-line of the double-concave lens of the cemented lens of the third lens group, $V_{1p}$ is an Abbe number of the double-convex lens of the cemented lens of the first lens group, and $V_{1n}$ is an Abbe number of the double-concave lens of the cemented lens of the first lens group.

2. The microscope objective lens of claim 1, wherein the positive lens of the second lens group is a double-convex lens.

3. The microscope objective lens of claim 1, wherein the positive lens of the second lens group is a positive meniscus lens.

4. The microscope objective lens of claim 3, wherein the positive meniscus lens has a concave surface facing the object side.

5. A finite optical system comprising a microscope objective lens consisting of, in order from an object side:

a first lens group consisting of a negative cemented lens consisting of a double-concave lens and a double-convex lens, a second lens group consisting of a single positive lens, and a third lens group consisting of a positive cemented lens consisting of a double-concave lens and a double-convex lens, wherein the following expressions are satisfied:

$-1.0 \leq f/f_{123} \, 0;$ $0 < n_{3n} - n_{3p};$ and $20 \leq v_{1p} - v_{1n};$ where f is a focal length of the microscope objective lens system, $f_1$ is a focal length of the first lens group, $n_{3p}$ is a refractive index for a d-line of the double-convex lens of the cemented lens of the third lens group, $n_{3n}$ is a refractive index for the d-line of the double-concave lens of the cemented lens of the third lens group, $v_{1n}$ is an Abbe number of the double-convex lens of the cemented lens of the first lens group, and $v_{1n}$ is an Abbe number of the double-concave lens of the cemented lens of the first lens group; and an imaging lens disposed on an image side of said microscope objective lens.

6. The finite optical system of claim 5, wherein the positive lens of the second lens group is a double-convex lens.

7. The finite optical system of claim 5, wherein the positive lens of the second lens group is a positive meniscus lens.

8. The finite optical system of claim 7, wherein the positive meniscus lens has a concave surface facing the object side.

* * * * *